United States Patent [19]
Rudd

[11] Patent Number: 6,037,556
[45] Date of Patent: Mar. 14, 2000

[54] HIGH FREQUENCY CONTACT WELDING APPARATUS WITH SKEWED CONTACTS

[75] Inventor: Wallace R. Rudd, New Canaan, Conn.

[73] Assignee: Thermatool Corp., Conn.

[21] Appl. No.: 09/189,317

[22] Filed: Nov. 11, 1998

[51] Int. Cl.⁷ .................................................. B23K 31/02
[52] U.S. Cl. ......................... 219/61.4; 219/61.2; 219/67
[58] Field of Search ................... 219/61.2, 61.4, 219/62, 102, 107, 67

[56] References Cited

U.S. PATENT DOCUMENTS

| | | | |
|---|---|---|---|
| 2,821,619 | 1/1958 | Rudd | 219/107 |
| 2,873,353 | 2/1959 | Rudd | 219/62 |
| 2,886,691 | 5/1959 | Rudd | 219/67 |
| 2,898,440 | 8/1959 | Rudd et al. | 219/61.2 |
| 2,992,319 | 7/1961 | Stanton | 219/67 |
| 3,047,712 | 7/1962 | Morris | 219/107 |
| 3,056,882 | 10/1962 | Morris et al. | 219/65 |
| 3,375,344 | 3/1968 | Kohler et al. | 219/107 |
| 3,391,267 | 7/1968 | Rudd | 219/102 |
| 4,241,284 | 12/1980 | Rudd et al. | 219/61.2 |

*Primary Examiner*—Patrick Ryan
*Assistant Examiner*—Anjan Dey
*Attorney, Agent, or Firm*—Norris, Mc Laughlin & Marcus; L. P. Brooks

[57] ABSTRACT

In high frequency welding apparatus in which high frequency electrical heating current is supplied to metal surfaces to be welded together by contacts engaging the metal which is advanced toward a weld point, the contacts engage the metal in advance of the weld point and have contact faces with downstream edges contacting the metal. The downstream edge of one of the contacts, or the downstream edges of the both of the contacts, is or are skewed with respect to the path or paths of the metal surfaces to be heated so that the downstream edge or edges extend at an acute angle of about 35° to about 55° with respect to the path or paths of the metal surface or surfaces, the angle being intermediate the contacts and the weld point.

20 Claims, 5 Drawing Sheets

HIGH FREQUENCY CONTACT WELDING APPARATUS WITH SKEWED CONTACTS

FIELD OF THE INVENTION

This invention relates to high frequency contact welding apparatus and methods in which the shaping and positioning of the contacts is selected to eliminate or substantially eliminate overheating and undesirable defacing of the part or parts being welded.

BACKGROUND OF THE INVENTION

Apparatus and methods for the forge welding together of a pair of metal parts or the edge portions of a single part folded to form a tube in which the surface portions of the metal part or parts to be welded together are advanced toward a weld point with a gap therebetween are heated by high frequency electrical currents supplied to the surfaces by way of contacts at opposite sides of the gap and contacting the metal part or parts in advance of the weld point are well known in the art. See, for example, U.S. Pat. Nos. 2,821,619; 2,873,353; 2,886,691; 2,898,440; 2,992,319; 3,047,712; 3,056,882; 3,375,344; 3,391,267 and 4,241,284 which are incorporated herein by reference.

In the high frequency prior art heating apparatus, the downstream edges of the contacts extend at substantially 90° to the paths of advance of the metal to be heated. In addition, the contacts are tilted so that only a small portion of the contact faces adjacent to the downstream edges contacts the metal to be heated. Thus, there is a very high current density at such portions of the contact faces. In addition, as will be further explained hereinafter, with high frequency currents and with the downstream edges of the contacts extending at 90° with respect to the path of the metal to be heated, a large proportion of the current leaves the contacts at the portions of the contact face nearest the heating current path in the metal. Therefore, the current density at the portions of the contact faces nearest the heating current path in the metal is much higher than elsewhere at the current faces.

The use of high frequency electrical currents, i.e. currents of a frequency of 10 KHz and higher, and particularly of 400 KHz and higher, for the heating of the surfaces to be welded together has certain well-known advantages as compared to the use of direct currents or currents of 500 Hz or lower. For example, "skin effect" causes most of the current to flow at the surface of a part where it is most useful, and such effect increases with frequency. Furthermore, the surfaces contacted by the contacts need not be clean, e.g. they can have scale or oxides thereon.

When direct currents or low frequency currents, i.e. 500 Hz or less are used, there is little skin effect. In addition, the current path, when proximity effect is not involved, is determined primarily by the resistance of the path because the inductive reactance of the current paths is zero or small. Thus, the current density per unit area of the face of the contact which contacts the part is substantially uniform. Accordingly, to decrease the current density, one merely has to increase the contact area.

Current density where the contact engages the metal part is important in at least two respects. Thus, if the density is too high, undesirable melting of the metal can occur in the area of contact or close thereto. Such melting is not desirable for forge welding because it defaces the metal and can cause hardening of the metal by self-quenching after it cools. Even if there is no melting, the metal can become discolored, have burn marks, cause self-quenched hardened areas or melt metal of the contacts onto the metal part which contact metal must be removed.

In actual practice with high frequency currents, the current can be several thousands of amperes with welding speeds, i.e. advancing speed, of 25–500 ft/min. It has been found that with such large currents, and hence, a high contact current density, the problems mentioned hereinbefore have been encountered but have been tolerated for some purposes because of the production speeds available.

Because of various pieces of equipment needed for mechanical reasons, e.g. forming rolls, forge welding pressure rolls, etc., the space available for the contacts and their mountings is limited. However, while increasing the size of the contacting face of the contacts causes some improvement with high frequency currents, there is a need for further improvement. Even with an increase of the size of the contacting face and high frequency currents, most of the current concentrates at the portion of the face nearest the metal surface to be heated and particularly, at the downstream corner nearest the surface being heated.

SUMMARY OF THE INVENTION

I have discovered, and have confirmed by tests, that by skewing the downstream edges of the contacts which supply high frequency electric current to surfaces of metal parts or opposite edge surfaces of a part (hereinafter sometimes referred to as "metal surfaces") to be forge welded together, the burning, hardening, discoloration, etc. of the part or parts where the contacts engage such parts can be substantially eliminated or at least substantially reduced thereby providing a better welded product.

In the prior art, the downstream edges of the contacts extend substantially perpendicularly to the paths followed by the metal surfaces to be heated as the metal surfaces are advanced. By skewing the contact downstream edges is meant that the downstream edges are oriented so that they extend at an acute angle of from about 35° to about 55°, preferably about 45° to the paths followed by the metal surfaces to be heated, the angle being intermediate the downstream edges and the weld point. To be more precise, the downstream edges lie in planes perpendicular to the metal surfaces which are contacted, and such planes intersect the paths of the metal surfaces to be heated at an acute angle so that the angles are defined between the planes and the portions of such paths downstream of the contacts. At an angle less than about 35°, the current increases at the downstream end of the contact edge and causes the undesirable effects mentioned, and at an angle greater than about 55° the desired current distribution is not obtained and the undesirable effects again occur.

Thus, for example, in a known process for welding of a tube or pipe seam, a single piece of metal is folded to bring the edge surfaces adjacent each other but with a gap therebetween as the metal is advanced to a weld point where the surfaces at forge welding temperature are forced together. The electrical heating current is supplied to the edge surfaces from a source of the current by way of a pair of contacts, one at one side of the gap and the other at the other side of the gap and both engaging the metal in advance of the weld point. Each contact has a linear, e.g. rectilinear, edge nearest the weld point, i.e. a downstream edge, which engages the metal and extends at an angle of from about 35 to about 55 with respect to the path of the edge surface of the metal as it is advanced. The angle is selected so that the current density at the edge portion of the contact is more nearly uniform throughout the width of the edge portion, i.e. the dimension of the edge portion in the direction transverse to the metal edge surface.

Similarly, if the metal surfaces to be heated are advanced toward a weld point in overlapping relation with a gap therebetween and the heating current is supplied thereto by contacts at opposite sides of the gap and engaging the metal in advance of the weld point, the downstream edges of the contacts extend at an angle from about 35° to about 55° with respect to the paths of the metal surfaces to be heated as the metal surfaces are advanced.

Also, if an edge surface of one metal part is to be welded to a surface of another part, which is not an edge surface, as in the manufacture of structural members, e.g. T, H or I beams or as on the welding of a fin to a tube, the principles of the invention apply. Thus, as the parts are advanced toward a forge weld point with a gap therebetween and the electrical current is supplied to the parts by contacts at opposite sides of the gap and engaging the parts in advance of the weld point, the downstream edges of the contacts are skewed as described hereinbefore.

Therefore, in accordance with the invention, the skewing of the contact or contacts is selected so that each portion of the edge of the contact nearest the weld point has, between such portion and the weld point, a path for the welding current which has substantially the same impedance, the resistance component of the impedance being small relative to the reactive component. In other words, the orientation of the downstream edge of a contact is selected so that the impedance of all current paths from the downstream edge to the weld point is more nearly equal whereby the heating current from the contact to the metal surface adjacent thereto which is to be heated is substantially uniform. In this way, the heating current is not concentrated at one portion of the contact, and hence, the problems described hereinbefore are substantially reduced.

If desired, each contact may comprise two or more conductively connected parts which, if desired, can be individually pressed toward the metal part, such as by springs or by an air cylinder.

BRIEF DESCRIPTION OF THE DRAWINGS

The invention will be better understood by reference to the following detailed description of preferred embodiments of the invention which description should be considered in connection with the accompanying drawings in which.

DETAILED DESCRIPTION OF PREFERRED EMBODIMENTS

The principles of the invention are applicable to the various types of high frequency contact welding systems, e.g. butt and lap welding of a longitudinal or spiral tube seam, structural members, such as T, I and H members, spiral fins on a tube, tubular cable sheathing, lip tubes with either a longitudinal or spiral lip and the welding of one metal strip to another metal strip as the strips are moved longitudinally with either a butt or lap weld.

Figure 1:
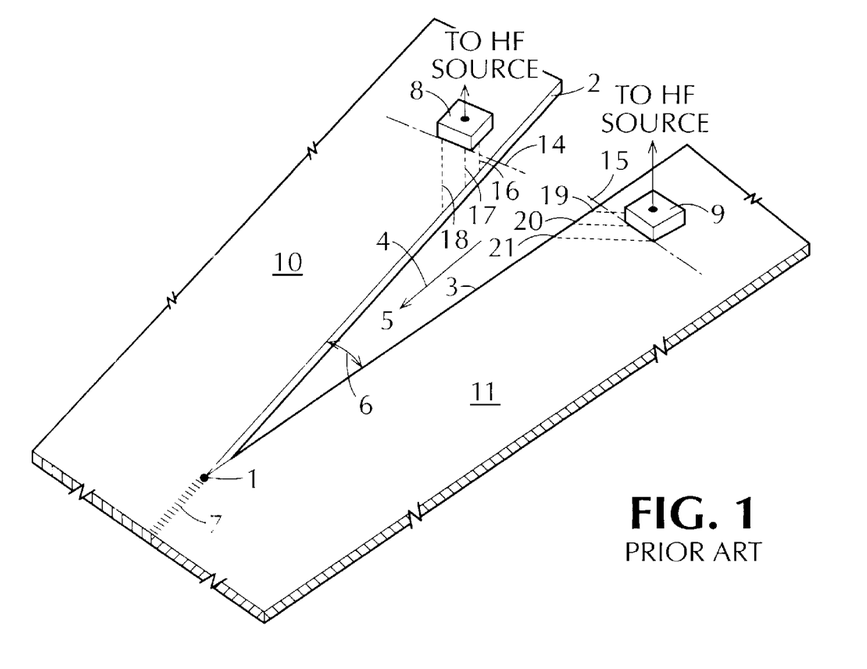
FIG. 1 is a diagrammatic, fragmentary, perspective view illustrating prior art high frequency forge welding of abutting edge surfaces of a metal strip or metal strips using contacts to supply high frequency electrical current from a source thereof to the metal strip or metal strips.

FIG. 1 illustrates diagramatically the prior art forge welding together at a weld point 1 of a pair of edge surfaces 2 and 3 which can be the edge surfaces of a pair of metal strips or the opposite edge surfaces of a single metal strip which has been folded to form a tube. The edge surfaces 2 and 3 are advanced in the direction of the arrow 4 and are separated by a gap 5 in advance of the weld point 1. To take advantage of the "proximity effect", the gap is relatively small, and the angle 6 between the edge surfaces can be about 4° to about 7°. A weld seam 7 is present following the weld point 1.

High frequency electric current, e.g. current of a frequency of at least 10 KHz, is supplied to the edge surfaces 2 and 3 by way of a pair of contacts 8 and 9 in sliding engagement with the top surfaces 10 and 11 of the metal part or parts with one contact 8 at one side of the gap 5 and the other contact 9 at the other side of the gap 5. The contact 8 is adjacent the edge surface 2, and the contact 9 is adjacent the edge surface 3. Normally, there is a small spacing between the edge surfaces and the respective contact as shown.

The contacts 8 and 9 have contact faces which contact the surfaces 10 and 11 and which have downstream rectilinear edges 12 and 13 which lie substantially on lines 14 and 15, respectively. Such lines 14 and 15 are respectively substantially perpendicular to the planes of the edge surfaces 2 and 3, and hence, the paths of the heating current in the metal.

From the contacts 8 and 9, the high frequency current flows in the metal part or parts along a plurality of contiguous paths to the edge surfaces 2 and 3, only three of the paths for each contact, paths 16–18 and 19–21, being indicated in dotted lines in FIG. 1. It will be observed that the paths of current flow have different lengths. With direct current or low frequency current, the amounts of current in each path is determined only by the resistance of each path, and therefore, the current in each path does not vary significantly. However, with high frequency current, the amounts of current in each path is determined not only by the resistance of each path which, due to skin effect, is higher than the direct current resistance, but also by the reactance of each path. In addition, due to the proximity of the contact 8 to the contact 9, the current density is greatest at the downstream corners of the contacts 8 and 9 which are nearest each other due to the proximity effect. It has been found that currents in the paths 16, 17, 19 and 20 are much larger than currents 18 and 21 and larger than currents along paths intermediate paths 17 and 18 and paths 20 and 21. Therefore, the current density at the edges 12 and 13 of the contacts 8 and 9 varies from a large value at the end of the edge 12 nearest the edge surface 2 to a significantly smaller value at the end of the edge 12 farthest from the edge surface particularly at current frequencies of 400 KHz and higher. The current density along the edge 13 similarly varies. It has been discovered that such variation in current distribution is the cause of the contact welding problems described hereinbefore.

After discovering the cause of the prior art contact welding problems, I have performed experiments and have found that the problems can be substantially eliminated or reduced by skewing the downstream edge of one or both, preferably both contacts, so that the downstream edge extends at an angle from about 35° to about 55°, preferably about 45°, to the path of the metal to be heated as the metal is advanced. Such angle is intermediate the contacts 8 and 9 and the weld point 1.

Figure 2:
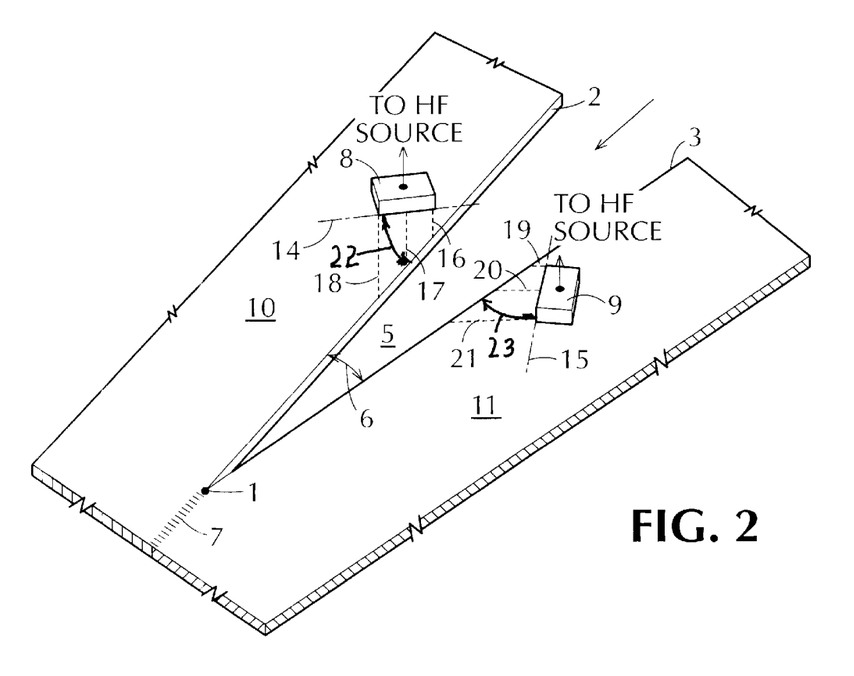
FIG. 2 is similar to FIG. 1 with the contact modifications of the invention.

FIG. 2 is a diagrammatic illustration of contacts skewed in accordance with the invention. Reference numerals in FIG. 2 which are the same as reference numerals in FIG. 1 designate the same elements. Although the contacts 8 and 9 can have the same size, respectively, as the contacts 8 and 9 in FIG. 1, the downstream edges 12 and 13 can be longer as shown in FIG. 2.

In FIG. 2, the downstream edges of the contacts 8 and 9 extend at acute angles 22 and 23 with respect to the paths of the edge surfaces 2 and 3 as they are advanced. Preferably, both angles are about 45°, but the angles can be in the range of about 35° to about 55° and need not be the same. With angles less than about 35° and more than about 55°, the current distribution alters so that the problems described hereinbefore again arise.

It will be observed from a comparison of FIGS. 1 and 2 that the lengths of the current paths which are spaced from the ends of the contacts 8 and 9 nearest the surfaces 2 and 3 are shorter in FIG. 2 than in FIG. 1. Accordingly, the impedances of such paths are smaller, and the magnitude of the current flow therein is greater. Therefore, for the same amount of heating current at the surfaces 2 and 3, the current is better distributed across the contact faces of the edges 12 and 13, and the currents in the paths 16, 17, 19 and 20 can be less and hence, overheating, burning, marring, etc. of the metal surfaces 10 and 11 by the currents in the paths 16, 17, 19 and 20 can be substantially eliminated.

Figure 3:
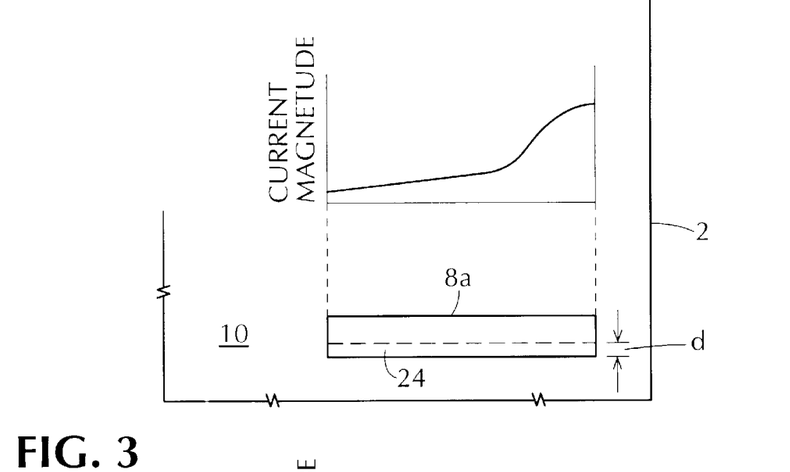
FIG. 3 is a graph related to the footprint of a contact on a metal surface of FIG. 1 and illustrates the current distribution at the downstream edge portion of the contact.
Figure 4:
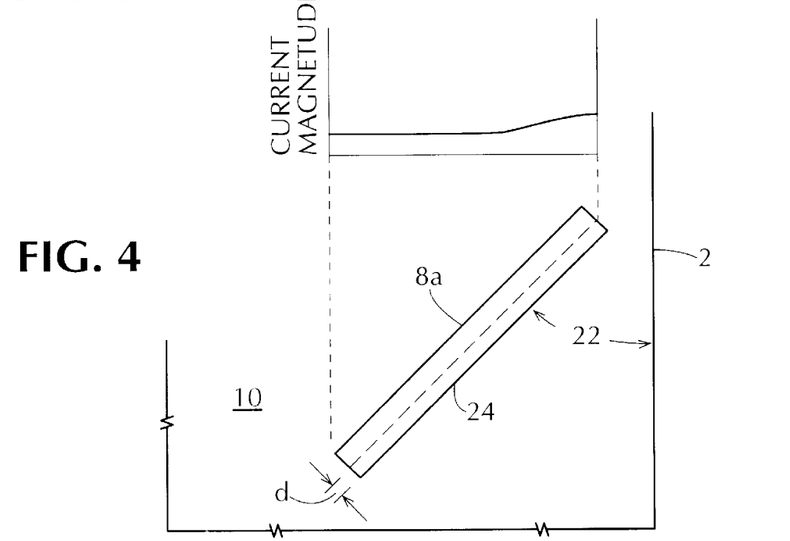
FIG. 4 is similar to FIG. 3 but illustrates the current distribution at the downstream edge portion of the contact when the contact is disposed in accordance with the invention.
Figure 5:
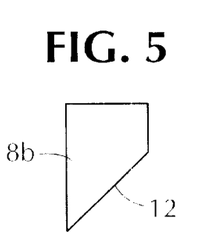
FIGS. 5–8 are end views of contacts illustrating various cross-sectional shapes which the contacts can have.
Figure 6:
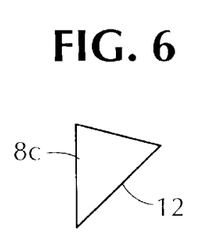
Figure 7:
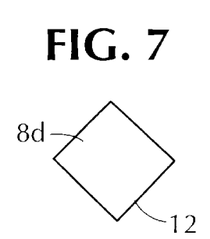

FIGS. 3 and 4 further illustrate diagrammatically the differences between the contact current density with prior art contacts and high frequency current and the contact current density with the contacts of the invention. Although, for simplicity, the effects with the contact 8 are described in connection with FIGS. 3 and 4, similar effects result with the contact 9.

As mentioned previously, the faces of the contacts are tilted with respect to the surface of the metal to be heated so that only a small portion of the contact face adjacent the downstream edge actually engages the metal surface at any given time. Also, for the most part, the heating electrical current leaves the contact face close to the downstream edge of the contact.

FIG. 3 illustrates the footprint 8a of the contact 8 shown in FIG. 1. Almost all the current will leave the contact 8 in the downstream portion 24 of the area defined by the footprint 8a. The dimension d in FIG. 3 can be of the order of 0.030 inches at 300–400 KHz.

The current distribution in the portion 24 is illustrated by the graph in the upper part of FIG. 3. Thus, the current in portion 26 is relatively large at the end of the footprint 8a nearest the surface 2 to be heated and is relatively small at the opposite end.

In contrast, when the downstream end of the contact 8 is skewed as shown in FIG. 4, the current density in the portion 24 can be nearly constant as illustrated by the graph in the upper part of FIG. 4 or at least, the difference between the current magnitudes at opposite ends of the portion 24 can be substantially less whereby the problems described hereinbefore can be substantially reduced or eliminated.

From the foregoing, it will be observed that only a relatively small portion of the contact face is necessary for supplying heating current to the metal surfaces 10 and 1 1. Therefore, it is necessary that the cross-section of a contact be only of a size and shape which will provide the necessary physical strength and wear life.

As shown in FIGS. 5–8 which show end views of contacts 8a–8e, the contacts 8a–8e being viewed facing the end of the contact which engages the metal surface, the contacts can have various cross-section shapes. Contact 9 can also have such shapes in reverse.

Because the contacts are connected to the high frequency power source by transmission lines, it is not convenient to skew the contact holder. Accordingly, it is preferred to use contacts with downstream edges, e.g. edge 12, skewed at the desired angle as shown in FIGS. 5–8 without changing the position of the contact holder.

Figure 8:
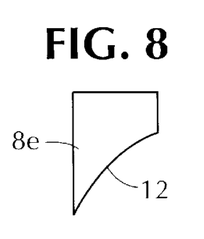

Preferably, the downstream edge is rectilinear, but if it is desired to modify the current density at the contact face, the downstream edge, e.g. edge 12, can be curvilinear as shown in FIG. 8.

The contacts used to supply heating current from the source to the metal to be heated can be mounted on supports or holders in any conventional manner. For example, the contacts 15 and 16 illustrated in U.S. Pat. No. 3,056,882 can be replaced by the contacts 8 and 9 of FIG. 2 herein so that the downstream edges of the contacts extend at an angle of about 35° to about 55° with respect to the paths of advance of the metal surfaces to be heated. Thus, the contacts 8 and 9 are pressed against the metal at opposite sides of the gap between the metal surfaces to be heated by springs 60 described in the U.S. Pat. No. 3,056,882.

Alternatively, the contacts 15 and 16 of U.S. Pat. No. 3,056,882 can be replaced by copper alloy bars 25 and 26 which extend through the holders 27 and 28 and are held in place by clamping screws, only the screw 29 being visible in FIG. 9, but a similar screw being present on holder 27. Thus, as the bars 25 and 26 wear, the clamping screws can be loosened, the bars 25 and 26 moved down and the screws tightened. The holders are urged toward the metal surfaces 10 and 11 by springs as described in said U.S. Pat. No. 3,056,882.

Figures 9, 10:
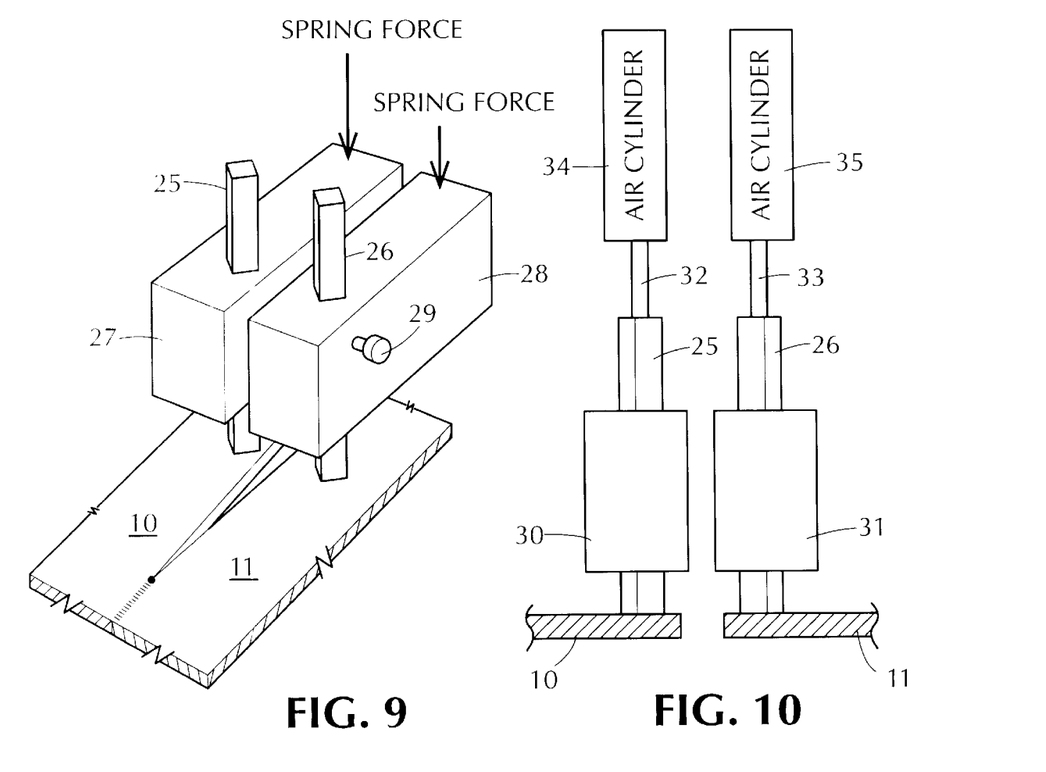
FIG. 9 is a diagrammatic, fragmentary, perspective view of one embodiment of holders for the contacts.
FIG. 10 is a diagrammatic, fragmentary, end elevation view of an alternate embodiment of the contact holders.

As a further alternative, the supports or holders can be held in fixed positions and slidably receive the bar contacts which air urged toward the metal by the piston rods of air actuated piston and cylinder assemblies as illustrated diagrammatically in FIG. 10. Thus, after the holders 30 and 31 are placed in the positions shown in FIG. 10, the holders 30 and 31 are held in fixed positions. The contact bars 25 and 26 extend through openings in the holders 30 and 31 and are slidably received in such openings. The contact bars 25 and 26 are urged toward the metal to be heated by the piston rods 32 and 33 actuable by pistons in the air cylinders 34 and 35.

Although contact bars 25 and 26 of square cross-section have been shown in FIGS. 9 and 10, it will be apparent to those skilled in the art that bars of other cross-sections, such as those shown in FIGS. 5–8, can be used in place of the contact bars 25 and 26.

As previously mentioned, each of the contacts can be made in a plurality of conductively connected parts, each part being separately movable toward and away from the metal to be heated and each part being separately biassed or urged toward the metal. It has been found that with such construction of the contacts, less arcing occurs between the contacts and the metal contacted.

Figure 11:
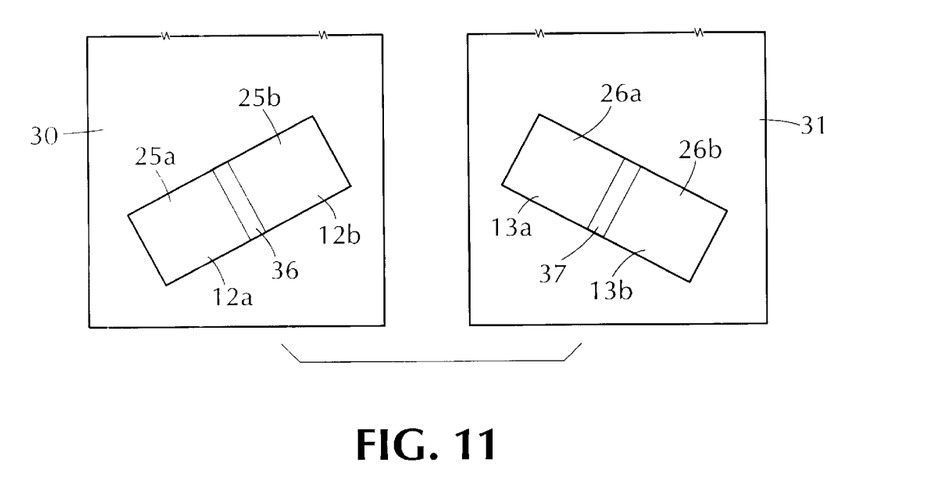
FIG. 11 is a diagrammatic, fragmentary, bottom view illustrating contacts of the invention with two parts.

FIG. 11 illustrates diagrammatically two part bar contacts which can be used, for example, in the embodiment shown in FIG. 10. In FIG. 11, the holder 30 slidably receives two bars 25a and 25b which are longitudinally movable with respect to each other and are separately urged toward the metal to be heated, such as by two air cylinder and piston assemblies 34. Similarly, the holder 31 slidably receives two bars 26a and 26b movable longitudinally with respect to each other and separately urged toward the metal to be heated, such as by two air cylinder and piston assemblies 35. The bars 25a and 25b and the bars 26a and 26b preferably are spaced from each other by high temperature insulation spacers 36 and 37. The parts or bars 25a and 25b have downstream edges 12a and 12b, respectively, which extend at an acute angle of about 35° to about 55° to the path of the metal to be heated and which are aligned with each other. The parts or bars 26a and 26b similarly have downstream edges 13a and 13b which are similarly oriented and aligned. The holders 30 and 31 being made of conductive metal, e.g. copper, conductively interconnect the contact parts held thereby. Although bar parts 25a and 25b and bar parts 26a and 26b have been shown as square in cross-section, it will be apparent to those skilled in the art that the parts can have other cross-sectional shapes.

As previously mentioned, the principles of the invention are applicable to contact welding methods and apparatus which are different from the methods and apparatus shown in FIGS. 1–11 and described in connection therewith. FIGS. 12–17 illustrate schematically other applications of the invention.

Figure 12:
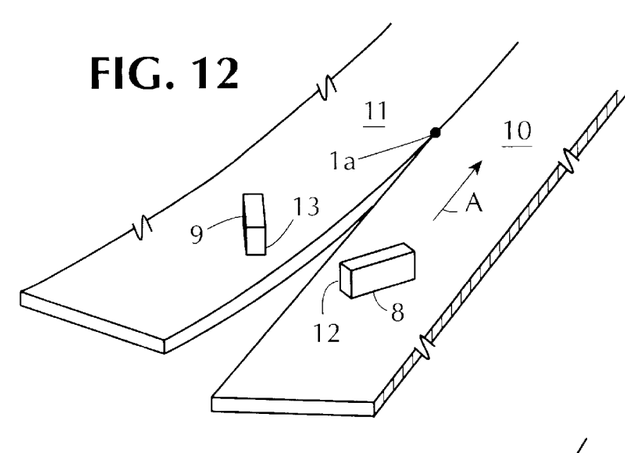
FIG. 12 is a diagrammatic, fragmentary, perspective view of the forge welding together of overlapping portions of a metal sheet or of metal sheets.

For example, if it is desired to form tubing with a weld seam or to weld two metal parts together with the metal overlapping at the weld, such as is disclosed in U.S. Pat. No. 2,886,691, the contacts 8 and 9 are disposed as shown in FIG. 12, i.e. with their downstream edges 12 and 13 extending at an angle of about 35° to about 55°, preferably about 45°, to the paths of the overlapping portions of the metal surfaces to be heated as they are advanced to the weld point 1a.

Figure 13:
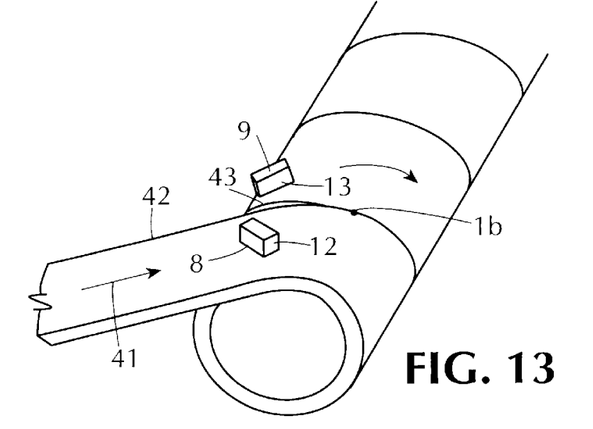
FIG. 13 is a diagrammatic, fragmentary, perspective view of the manufacture of tubing by spirally winding a ribbon and forge welding edge portions of the ribbon together.

FIG. 13 illustrates the positioning of the contacts 8 and 9 in the welding of helically formed tubing as described in U.S. Pat. No. 2,873,353, FIG. 13 specifically illustrating butt welding but the positioning of the contacts 8 and 9 being the same for lap welding. Thus, as the tube 38 with a helical weld seam is rotated in the direction of the arrow 39, a metal ribbon 40 is advanced in the direction of the arrow 41 toward a weld point 1b. The downstream edges 12 and 13 of the contacts 8 and 9 extend at an angle of about 35° to about 55°, preferably about 45° to the paths of the edge surfaces 42 and 43 as they are advanced to the weld point 1b.

Figure 14:
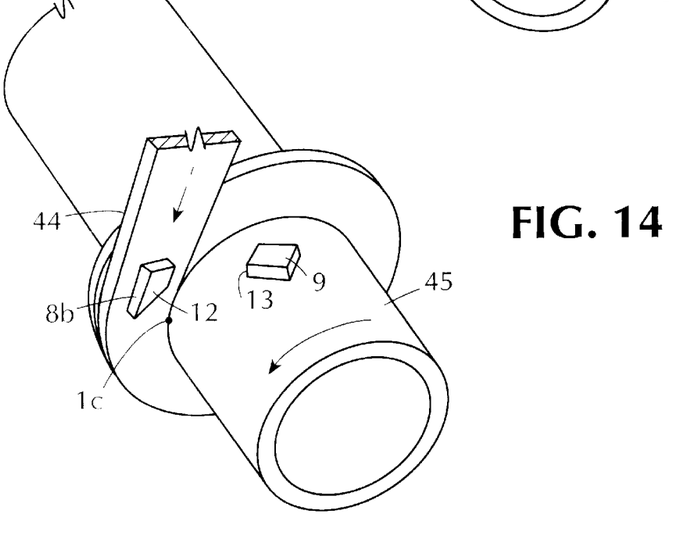
FIG. 14 is a diagrammatic, fragmentary, perspective view of the forge welding of a fin on a tube.

FIG. 14 illustrates the positioning of the contacts 8b and 9 in the welding of a fin 44 on a tube as described in U.S. Pat. No. 3,047,712 except that the contact 8b engages the side of the fin 44 rather than the top edge of the fin 44. Depending upon the width of the fin 44, the contact 8 or 8a, or any of the contacts previously described, can be used to contact the fin 44. In the fin 44 is relatively narrow, it may be preferable to use the contact 8a as shown in FIG. 14.

The downstream edges 12 and 13 of the contacts 8a and 9 are oriented as previously described with respect to the paths of the metal to be heated as such metal of the tube 45 and the fin 44 are advanced to the weld point 1c.

Figures 15, 16:
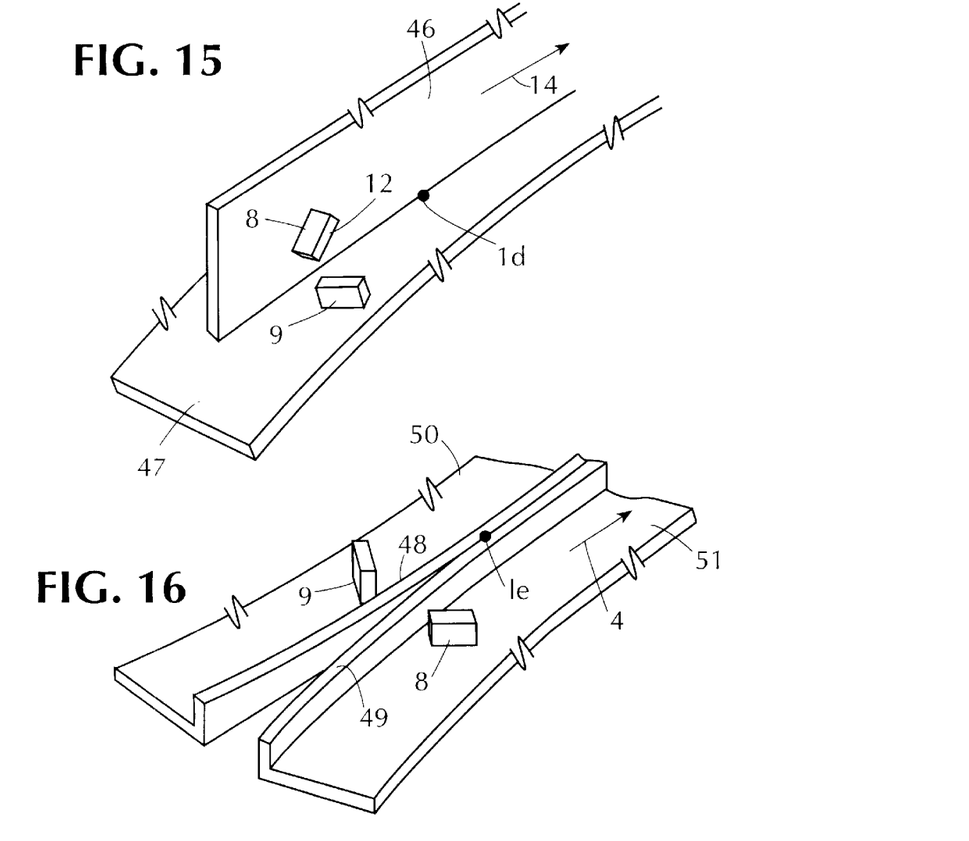
FIG. 15 is a diagrammatic, fragmentary, perspective view of the manufacture of a T-shaped element by forge welding an edge portion of a metal strip to an intermediate portion of another metal strip.
FIG. 16 is a diagrammatic, fragmentary, perspective view of the forge welding together of the lips on a metal sheet or on metal sheets.

FIG. 15 illustrates the positioning of the contacts 8 and 9 in the manufacture of welded structural elements as described in U.S. Pat. Nos. 2,821,619 and 3,391,267, the welding of a T-shaped element being specifically shown in FIG. 15 but the positioning of the contacts with respect to H-shaped elements being apparent from FIG. 15 and U.S. Pat. No. 3,391,267. Thus, two pairs of contacts of the invention replace the two pairs of contacts used in the welding of H-shaped structural elements.

In FIG. 15, a pair of metal strips 46 and 47 are advanced toward a weld point 1d in the direction of the arrow 4 with a gap therebetween in advance of the weld point 1d. The downstream edges of the contacts 8 and 9, such as the edge 12 of contact 8, extend at an angle of from about 35° to about 55°, and preferably about 45°, with respect to the paths of the metal of the strips 46 and 47 to be heated. Since the path adjacent to contact 9 in which the heating current flows is not at the edges of the strip 47, it can be desirable to increase the length of the path of the heating current in the strip 47 relative to the path of the current in the strip 46. Accordingly, the contact 9 can be further upstream from the weld point 1d than the contact 8 as shown in FIG. 15.

FIG. 16 illustrates the positioning of the contacts 8 and 9 for the welding together of lips 48 and 49 which can be formed at the opposite edges of a metal sheet formed into a tube as shown in U.S. Pat. No. 2,992,319 or at the edges of a pair of sheets to be secured together.

Thus, there are a pair of metal surfaces 50 and 51 terminating in lips 48 and 49 to be forge welded together at a weld point 1e. The lips 48 and 49 are advanced toward the weld point 1e with a gap therebetween and the heating current flows on the facing surfaces of the lips 48 and 49 and is supplied thereto by way of the contacts 9 and 8 respectively engaging the surfaces 50 and 52. The downstream edge of the contact 9 extends at an angle from about 35° to about 55°, preferably about 45°, with respect to the path of the surface of the lips 48 being heated and the downstream edge of the contact 8 extends at a similar angle with respect to the path of the surface of the lip 49 being heated.

Figure 17:
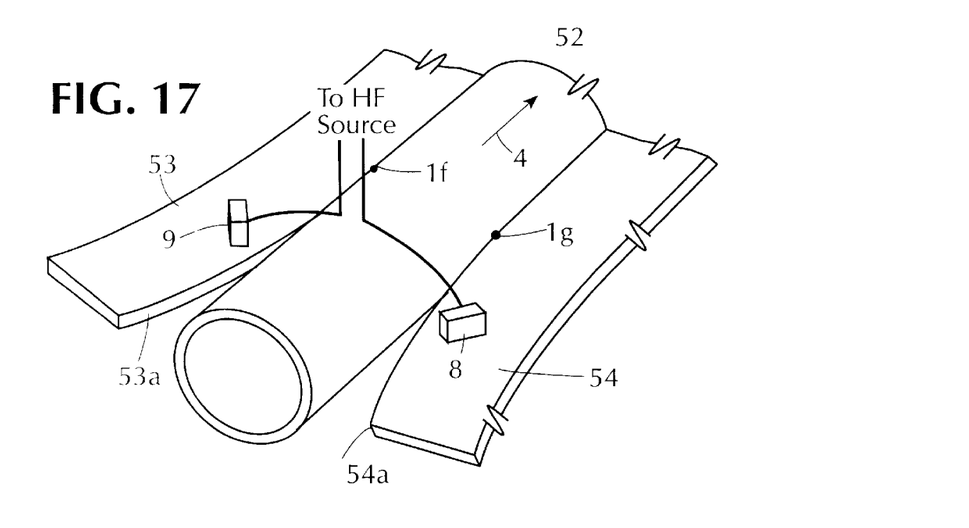
FIG. 17 is a diagrammatic, fragmentary, perspective view of the forge welding of two longitudinal metal strips to a tube.

FIG. 17 illustrates the positioning of the contacts 8 and 9 when a pair of metal strips are being welded to a metal tube as described in U.S. Pat. No. 3,375,344. Thus, as the tube 52 and the strips 53 and 54 are advanced in the direction of the arrow 4, the strips 53 and 54 are heated at their faces 53a and 54a and the longitudinal surface portions of the tube 52 adjacent thereto are heated by the electric current supplied by way of contacts 8 and 9 connected to a high frequency electric power source by way of leads 55 and 56 overlying the tube 52. In advance of the weld points 1f and 1g, there are gaps between the strips 53 and 54 and the tube 52. At the weld points 1f and 1g, the strips 53 and 54 are pressed adjacent the tube 52 to form forge welds therebetween.

The downstream edges of the contacts 8 and 9 extend, with respect to the paths of the metal to be heated, at an angle between about 35° and about 55°, preferably about 45°.

In the embodiments described hereinbefore, the downstream edges of the contacts can extend at the same angle with respect to the paths of the metal being heated and advanced. However, the downstream edges of the contacts can extend at different acute angles with respect to such paths. Also, in some cases, such as when marking of one of the metal pieces is not objectionable, the downstream edge of the contact engaging such one metal piece can extend at 90° with respect to the path of the metal being heated, as in the prior art. In addition, in the embodiments described hereinbefore, both contacts can have the same cross-sectional shape, or the cross-sectional shape of one contact can be different from the cross-sectional of the other contact.

It will be understood that the various methods and devices for cooling the contacts and their supports which are known in the art can, and normally would, be used in the apparatus of the invention.

Although preferred embodiments of the present invention have been described and illustrated, it will be apparent to those skilled in the art that various modifications may be made without departing from the principles of the invention.

What is claimed is:

1. In high frequency welding apparatus in which facing metal surfaces to be welded together are advanced along adjacent paths toward a weld point with a gap between the metal surfaces, the surfaces are heated to forge welding temperature prior to reaching the weld point by supplying high frequency electric current to the surfaces by way of a first contact having a contact face with a downstream edge contacting the metal at one side of said gap in advance of the weld point and adjacent one of said facing metal surfaces and by way of a second contact having a contact face with a downstream edge contacting the metal at the other side of said gap in advance of the weld point and adjacent the other of said facing metal surfaces and in which the facing metal surfaces are pressed together at the weld point to form a weld at the weld point, wherein the improvement comprises:

the contact face of at least one of said first contact and said second contact has a downstream edge extending at an acute angle of about 35° to about 55° with respect to the path of said metal surface adjacent to said at least one contact, said angle being intermediate the contacts and said weld point.

2. High frequency welding apparatus as set forth in claim 1 wherein said acute angle is about 45°.

3. High frequency welding apparatus as set forth in claim 1 wherein said one of said first contact and said second contact is said first contact and wherein said contact face of said second contact also has a downstream edge extending at an acute angle of about 35° to about 55° with respect to the path of the other of said facing metal surfaces.

4. High frequency welding apparatus as set forth in claim 3 wherein said acute angle is about 45° for both the downstream edge of said first contact and the downstream edge of said second contact.

5. High frequency welding apparatus as set forth in claim 1 wherein the downstream edge of at least one of said first contact and said second contact is substantially rectilinear.

6. High frequency welding apparatus as set forth in claim 1 wherein the downstream edge of at least one of said first contact and said second contact is substantially curvilinear.

7. High frequency welding apparatus as set forth in claim 1 further comprising a first mounting means for receiving said first contact and a second mounting means for receiving said second contact, and wherein each of said contacts is an elongated conductive metal bar, said first contact being slidably mounted on said first mounting means for movement toward and away from said metal at one side of said gap and said second contact being slidably mounted on said second mounting means for movement toward and away from said metal at the other side of said gap and means for urging each of said first contact and said second contact into contact with the metal respectively at opposite sides of said gap.

8. High frequency welding apparatus as set forth in claim 7 wherein said means for urging each contact comprises means for releasably securing each of said first and said second contact to its respective mounting means and spring means urging each of said mounting means toward said metal.

9. High frequency welding apparatus as set forth in claim 7 wherein said means for urging each contact comprises air actuated piston and cylinder assemblies coupled to said contacts.

10. High frequency welding apparatus as set forth in claim 1 wherein said one contact has two conductively connected parts contacting the metal, each part having a downstream edge extending at said acute angle.

11. High frequency welding apparatus as set forth in claim 10 wherein the downstream edge of one said part is aligned with the downstream edge of the other said part.

12. High frequency welding apparatus as set forth in claim 1 wherein said facing metal surfaces are the opposite edge surfaces of a metal sheet which has been folded to bring the opposite edge surfaces into facing and spaced relation in advance of the weld point.

13. High frequency welding apparatus as set forth in claim 1 wherein said facing metal surfaces are the edge surface of a first metal sheet and the edge surface of a second metal sheet.

14. High frequency welding apparatus as set forth in claim 1 wherein said facing metal surfaces are a first portion of the upper surface adjacent one edge of a metal sheet and a second portion of the lower surface adjacent another edge of the metal sheet which overlaps said first portion.

15. High frequency welding apparatus as set forth in claim 1 wherein said facing metal surfaces are a portion of a surface of a first metal sheet adjacent an edge of said metal sheet and a portion of a surface of a second metal sheet adjacent an edge of said second metal sheet which overlaps said portion of a surface of said first metal sheet.

16. High frequency welding apparatus as set forth in claim 1 wherein said facing metal surfaces are the edge portions of a metal ribbon which is formed into a metal tube with a helical weld seam.

17. High frequency welding apparatus as set forth in claim 1 wherein said facing metal surfaces arc an edge surface of a metal fin and a circumferential surface portion of a metal tube.

18. High frequency welding apparatus as set forth in claim 1 wherein said facing metal surfaces are an edge surface of a first metal strip and a surface portion of a second metal strip intermediate the edge of said second metal strip.

19. High frequency welding apparatus as set forth in claim 1 wherein said facing metal surfaces are surfaces of lips formed at the edges of a metal sheet or sheets.

20. High frequency welding apparatus as set forth in claim 1 wherein said facing metal surfaces are an edge surface of a metal strip and a surface portion of a metal tube extending longitudinally of said tube.

* * * * *